United States Patent
Blackwood et al.

[15] 3,697,610
[45] Oct. 10, 1972

[54] PRODUCTION OF CARBON TETRACHLORIDE

[72] Inventors: James O. Blackwood, Hawthorn; Brian D. Cullis, Blackburn, both of Victoria, Australia

[73] Assignee: Commonwealth Scientific and Industrial Research Organization, East Melbourne, Victoria, Australia

[22] Filed: April 22, 1970

[21] Appl. No.: 30,992

[52] U.S. Cl. ................................................. 260/664
[51] Int. Cl. ................................................. C07c 19/06
[58] Field of Search ................................... 260/664

[56] References Cited

UNITED STATES PATENTS 870,518   11/1907   Maywald ................... 260/664
2,223,448   12/1940   Hennig ...................... 260/664

OTHER PUBLICATIONS

Stock et al. Z. Anorg. Allgem. Chem. 195, 149– 157 (1931) Call No. QD1.24

*Primary Examiner*—Daniel D. Horwitz
*Attorney*—Sughrue, Rothwell, Mion, Zinn & Macpeak

[57] ABSTRACT

Carbon tetrachloride is produced by the direct reaction of chlorine and activated carbon at temperatures above 500° C and pressures above 5 atmospheres absolute. No catalyst is used. Activity of the carbon is enhanced by mixing air with the chlorine or by alternate treatment of the carbon with air and chlorine.

6 Claims, No Drawings

PRODUCTION OF CARBON TETRACHLORIDE

This invention relates to the production of carbon tetrachloride from the elements.

According to this invention there is provided a process for producing carbon tetrachloride which comprises reacting carbon with chlorine at a temperature of 500° C or more and under a pressure of 5 atmospheres absolute or more.

It is preferred that the reaction is carried out at a temperature of 500° – 900° C and under a pressure of 5 to 30 atmospheres absolute.

The carbon should be in the form of grains or powder; the actual size to be used depending on whether the reaction is to be carried out with a fluidized or fixed bed of carbon.

The carbon is preferably prepared by carbonizing wood, lignite or coal at a temperature of from 700° to 900° C. Such treatment causes loss of hydrogen and oxygen and leaves a residue which is 90 to 95 percent carbon. It is important that as much hydrogen as is possible is removed otherwise hydrogen chloride may be formed. However, it should be noted that as it is very difficult to remove all hydrogen and the formation of some hydrogen chloride is inevitable. Hydrogen reacts very rapidly with chlorine and is converted to hydrochloric acid in the first few seconds of reaction. We deal with this problem by discarding the initial pass of chlorine through the carbon.

The reactivity of the carbon can be increased by passing air through it. This may be done by alternating passes of chlorine and air or by passing a mixture of air and chlorine through the carbon. In this respect it should be noted that it is believed that it is the alternate treatment by chlorine and oxygen from the air or alternatively the combined treatment by a mixture of air and chlorine which increases the reactivity of the carbon.

For example, we have found that treatment of a 900° C wood char with air at 350° C in a fluidized bed for 5 minutes, followed by a nitrogen purge and treatment with chlorine for 5 minutes at 800° C will about double the reactivity and that subsequent like treatments will increase the reactivity of the char seven fold.

We have found that under a pressure of 10 atmospheres absolute and a temperature of 700° C wood char carbonized at 850° C and activated when considered necessary with alternate air-chlorine treatment at 300° C produced a continuous yield of 4 percent v/v carbon tetrachloride in the chlorine exiting from the carbon. This corresponded to a rate of formation of carbon tetrachloride of $100 \times 10^{-6}$ gram moles/minute/gram of carbon present. This represents approximately 1 Kg carbon tetrachloride/hour/Kg of carbon present. In the same circumstances but under a temperature of 800° C and a pressure of 10 atmospheres absolute the rate of formation of carbon tetrachloride was increased to about $250 \times 10^{-6}$ gram moles/minute/gram of carbon present. The last mentioned rate was increased by two times by continuously passing a mixture of air and chlorine through the carbon.

The yield of carbon tetrachloride depends on temperature, pressure, flow rate of chlorine, nature and particle size of the carbon, and the size and nature of the bed of carbon used. In general, within the temperature range 500° – 900° C and pressure range of 5 – 30 atmospheres absolute, the rate of production of carbon tetrachloride is directly proportional to pressure and exponentially proportional to temperature.

A preferred process in accordance with this invention is operated by continuously passing chlorine through a heated and pressurized tubular reactor containing either a fixed or fluidized bed of carbon, separating the carbon tetrachloride formed by condensation and recycling the unused chlorine.

The process of this invention is advantageous in that carbon tetrachloride can be produced from the elements in a continuous process and provided that chlorine is recirculated it is substantially completely utilized in the formation of carbon tetrachloride. Further, it is found that other chlorocarbons or chlorohydrocarbons are not found in the product in substantial amounts and it is believed that those that are formed in the reaction are converted into carbon tetrachloride and the resultant carbon tetrachloride requires no purification other than separation from unused chlorine. Carbon produced by carbonizing readily available and cheap carbonaceous materials may be used. Still further, hydrogen chloride is produced substantially only at the commencement of the reaction and product contamination may be avoided by discarding the initial chlorine pass.

The invention is now further described in the following specific examples.

EXAMPLE I

In a tubular silica reactor tube, 17 mm diameter and heated electrically in a pressure vessel, is a bed of granular wood char fully activated by alternate treatments of chlorine and air as described above, 40 cm long and weighing 12 g. When chlorine is passed through this bed at 750° C and 20 atmospheres, the outlet gas contains 6 percent v/v carbon tetrachloride which is being produced at the rate of $6.3 \times 10^{-4}$ g/minute - no other chlorocarbons could be detected.

EXAMPLE II

In the same apparatus with the same type of carbon used in Example I and a temperature of 650° C and pressure of 20 atmospheres, 8.5 percent v/v carbon tetrachloride was produced at a rate of $3.8 \times 10^{-4}$ g/minute.

EXAMPLE III

Similarly at 700° C and 20 atmospheres, 7 percent v/v carbon tetrachloride was produced at a rate of $14.5 \times 10^{-4}$ g/minute.

EXAMPLE IV

Similarly at 800° C and 20 atmospheres with a bed of wood char 10 cm long and weighing 3 g, 2 percent v/v $CCl_4$ was formed at a rate of $26 \times 10^{-3}$ g/minute.

EXAMPLE V

In the same apparatus with a 6.2 g sample of unactivated char prepared by carbonizing lignite at 870° C and a reaction temperature of 750° C and pressure of 10 atmospheres, carbon tetrachloride was produced at a rate of $19.3 \times 10^{-4}$ g/min.

EXAMPLE VI

In the same apparatus with a 5.6 g sample of unactivated coke prepared by carbonizing a sample of Bituminous coal at 780° C and a reaction temperature of 750° C and pressure of 10 atmospheres, carbon tetrachloride was produced at a rate of $5.4 \times 10^{-4}$ g/min.

EXAMPLE VII

In the same apparatus, with a 4.8 g sample of unactivated wood char, chlorine was passed at 750° C at 10 atmospheres through the bed and the rate of production of $CCl_4$ was $222 \times 10^{-4}$ g/minute. With 8.5 percent air admitted with the chlorine, the $CCl_4$ production rate was increased to $554 \times 10^{-4}$ g/minute. When the air was stopped, the rate returned to $259 \times 10^{-4}$ g/minute.

These examples show that with a sufficiently large reactor it should be possible to produce near equilibrium concentration of carbon tetrachloride at an economical rate. For example, at 800° C a concentration of about 15 percent v/v should be possible.

Accordingly, it will be realized that the present invention provides a simple and cheap process for producing carbon tetrachloride. However, it is to be noted that many modifications can be made to the process as described and that all such modifications are considered to be within the spirit and scope of this invention.

We claim:

1. A process for continuously producing carbon tetrachloride which comprises reacting carbon with chlorine at a temperature of 500° C or more and under a pressure of 5 to 30 atmospheres absolute, the carbon being prepared from carbonaceous material by carbonizing at a temperature of from 700° C to 900° C, and the reactivity of the carbon being increased by contacting the carbon with air.

2. A process as claimed in claim 1, wherein the reaction is carried out at a temperature of 500° C to 900° C.

3. A process as claimed in claim 2, wherein the reactivity of the carbon is increased by contacting with a mixture of air and chlorine.

4. A process as claimed in claim 2, wherein the reactivity of the carbon is increased by contacting alternately with air and chlorine.

5. A process for producing carbon tetrachloride comprising the steps of continuously passing chlorine through a bed of carbon at a temperature of from 500° C to 900° C and a pressure of from 5 to 30 atmospheres absolute, the carbon being prepared from carbonaceous material by carbonizing at a temperature of from 700° C to 900° C, and the reactivity of the carbon being increased by contacting the carbon with air; separating carbon tetrachloride from the gases emerging from the bed; and recycling unused chlorine to the bed.

6. A process as claimed in claim 5, wherein the bed is fixed or fluidized and is contained in a heated and pressurized tubular reactor.

* * * * *

UNITED STATES PATENT OFFICE
CERTIFICATE OF CORRECTION

Patent No. 3,697,610      Dated    October 10, 1972

Inventor(s)   James O. Blackwood et al

It is certified that error appears in the above-identified patent and that said Letters Patent are hereby corrected as shown below:

In The Heading:

The Priority Data was omitted: Should read:

--April 24, 1969      Australia........No. 54,006/69--

Signed and sealed this 1st day of May 1973.

(SEAL)
Attest:

EDWARD M. FLETCHER, JR.      ROBERT GOTTSCHALK
Attesting Officer            Commissioner of Patents